United States Patent Office 3,087,843
Patented Apr. 30, 1963

3,087,843
SOLID PROPELLANT COMPOSITIONS
James E. Pritchard, Bartlesville, Okla., assignor to Phillips Petroleum Company, a corporation of Delaware
No Drawing. Filed Aug. 10, 1953, Ser. No. 373,441
15 Claims. (Cl. 149—19)

This invention relates to solid propellant compositions. In a further aspect this invention relates to solid propellant compositions containing, as materials to overcome retardation and inhibition of curing, epoxy compounds. In a further aspect this invention relates to a method of overcoming retardation and inhibition in curing of solid rocket propellant compositions in which the binders are vulcanizable rubbery materials which comprises adding epoxy compounds as curative agents. In a further aspect this invention relates to a method of overcoming retardation and inhibition in the curing rate of solid rocket propellant compositions in which the binders are vulcanizable rubbery materials and the combustion rate catalysts are of the metal ferrocyanide and ferricyanide type, which comprises incorporating into the compositions epoxy compounds as curative agents and the products produced as a result of this incorporation.

Vulcanizable rubbery materials are used as binders in solid rocket propellant compositions. These compositions also include an oxidant, combustion rate catalyst and a vulcanizing agent. In such compositions, due to the incorporation of the combustion rate catalysts, the rate of curing is frequently very low. This is especially true when combustion rate catalysts of the metal ferrocyanide and ferricyanide type are used. However, such catalysts are frequently used since they increase the burning rate and are especially effective in decreasing the pressure sensitivity. By the process of my invention, I have found a method by which these catalysts may be used while still permitting favorable rates of curing.

Each of the following objects is obtained by at least one of the aspects of this invention.

An object of this invention is to provide solid rocket propellant compositions.

A further object of this invention is to provide solid propellant compositions containing a rubbery binder and which are capable of being cured at favorable rates.

A further object of this invention is to provide solid propellant compositions in which the binders are vulcanizable rubbery materials and the combustion rate catalysts are of the metal ferrocyanide and ferricyanide type, these improved compositions containing an epoxy compound as a curative agent.

A further object of this invention is to provide a method of preparing these compositions.

A further object of this invention is to overcome retardation and inhibition of the curing rate of these compositions, this object being accomplished by the incorporation of epoxy compounds in the composition.

Other objects and advantages of this invention will be apparent to one skilled in the art upon reading this specification.

I have discovered a means for preventing both retardation and inhibition in the curing rate of solid rocket propellant compositions in which the binders are vulcanizable rubbery materials. The method comprises the incorporation into the composition of epoxy compounds as curative agents. The invention provides special superiority where the combustion rate catalysts are of the metal ferrocyanide and ferricyanide type and where the rubbery binder is a butadiene/vinylpyridine copolymer.

The compositions are prepared by mixing a vulcanizable rubbery material, the various types of ingredients normally used in compounding a rubbery polymer, a solid oxidant, a combustion rate catalyst and an epoxy compound, and curing the resulting material, as more fully set forth below.

Vulcanizable rubbery materials are advantageous as binders in solid rocket propellant compositions. They are strong and elastic over a wide temperature range and provide a matrix that will accommodate a solid oxidant over a wide range of service conditions. In the production of solid rocket propellant compositions, a vulcanizable rubbery material, various ingredients employed in rubber compounding operations, and a solid oxidant are mixed and cured under conditions to effect vulcanization. In the fabrication of a rocket grain, it is desirable that a combustion rate catalyst be present. Various catalysts such as red oxide of iron (rouge), ammonium dichromate, and ferric ferrocyanide (Prussian blue) can be used. Of these catalysts, Prussian blue and other similar materials of the metal ferrocyanide and ferricyanide type are particularly desirable since they increase the burning rate and are especially effective in decreasing the pressure sensitivity (referred to as the pressure sensitivity exponent or burning rate exponent) of the propellant composition. In other words, when combustion rate catalysts of the type of Prussian blue are employed, the pressure generally changes less with temperature than when other catalysts, such as rouge and ammonium dichromate, are used. While combustion rate catalysts of the type of metal ferrocyanides and ferricyanides are advantageous in many respects, it has been observed that when they are employed in compositions using vulcanizable rubbery binders, they greatly retard and/or inhibit the curing rate. This invention provides a method for overcoming the retardation and/or inhibition in curing rate of solid propellant compositions when vulcanizable rubbery materials are used as binders and metal ferrocyanides and ferricyanides are employed as combustion rate catalysts.

Epoxy compounds which are applicable as curative agents include ethylene oxide, propylene oxide (1,2-epoxypropane), butylene oxide (1,2-epoxybutane), 1,2-epoxypentane, 1,2-epoxy-3-methylbutane, styrene oxide, epihalohydrins such as epichlorohydrin and epibromohydrin, butadiene monoxide, and the like. Epoxy compounds containing polymeric chains derived from conjugated dienes or from vinyl or condensation polymerization are also applicable. Examples of epoxy resins which are applicable and which are commercially available are the Epon resins of which several types, ranging from liquids to hard resins, can be obtained. Epoxy compounds of the polymeric or resinous type generally have molecular weights ranging from around 250 to 10,000 and can be represented by the formula

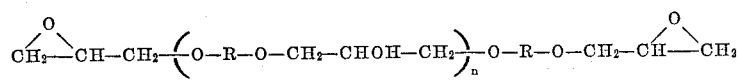

The amount of epoxy compound employed in the solid propellant compositions is based on the amount of rubbery polymer present. It is dependent upon the epoxy compound used but will generally be in the range from 0.5 to 40 parts by weight per 100 parts by weight of the rubbery polymer, preferably 1 to 25 parts by weight.

The rubbery materials employed as binders are those which are vulcanizable and include homopolymers of conjugated dienes and copolymers of conjugated dienes with materials copolymerizable therewith which will produce the desired rubbery products. Monomeric materials which can be employed with conjugated dienes include styrene, alpha-methylstyrene, halogen-substituted styrene, acrylonitrile, methacrylonitrile, methyl acrylate, methyl methacrylate, ethyl acrylate, butyl acrylate, and vinyl-substituted heterocyclic nitrogen compounds containing a vinylidene ($CH_2=C<$) group, such as those of the pyridine and quinoline series which contain at least one

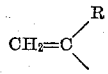

substituent wherein R is either hydrogen or a methyl group, i.e., the substituent is either a vinyl or an alpha-methylvinyl (isopropenyl) group. The heterocyclic nitrogen bases of the pyridine and quinoline series which are preferred are those having only one vinylidene group. Various alkyl-substituted derivatives are also applicable but its is generally preferred that the total number of carbon atoms in the nuclear substituted alkyl groups should not be greater than 12 and most frequently these alkyl substituents are methyl and/or ethyl. Examples of such compounds are 2-vinylpyridine; 2,5-divinylpyridine; 2-methyl-5-vinylpyridine; 2,3,4-trimethyl-5-vinylpyridine; 3,4,5,6 - tetramethyl - 2 - vinylpyridine; 3 - ethyl - 5 - vinyl-pyridine; 2,6-diethyl-4-vinylpyridine; 2-isopropyl-4-nonyl-5-vinyl-pyridine; 2-methyl-5-undecyl-3-vinylpyridine; 3-dodecyl-4,5-divinyl-pyridine; 2,4-dimethyl-5,6-dipentyl-3-vinylpyridine; 2-decyl-5($\alpha$-methylvinyl)pyridine; 3,5-di($\alpha$-methylvinyl) pyridine; and the like. Similar derivatives of the quinoline series are also applicable.

Quaternary ammonium salts of rubbery copolymers of vinyl-substituted heterocyclic nitrogen bases are also applicable as are polymeric 2-hydroxyalkyl pyridinium and quinolinium salts prepared by the interaction of a rubbery copolymer of a conjugated diene and a pyridine or quinoline derivative containing a vinylidene group with an acid followed by treatment of the product with an epoxy compound. Rubbery polymers prepared from various mixtures of conjugated dienes with each other or with one or more other types of copolymerizable materials can also be used.

For the production of the copolymers employed in the practice of this invention, the amount of conjugated diene employed is generally in the range from 25 to 100 parts per 100 parts of the total monomeric material and the amount of comonomer is in the range from 75 to 0 parts per 100 parts of the total monomeric material.

Rubbers having low Mooney values are particularly suitable for binders in solid rocket propellant compositions. They can be cured into exceptionally strong, extensible, and adhesive rubbers. When a low Mooney binder is employed, the propellant can be processed in equipment now in use by the rubber industry.

Oxidants which are applicable in the practice of the invention are those oxygen-containing solids which are employed as oxidizing agents and/or which readily give up oxygen. They include ammonium nitrate and other ammonium and alkali metal compounds such as potassium and sodium perchlorates, chlorates, chlorites, and hypochlorites. Dichromates, chromates, chromites, and persulfates are also applicable. Although ammonium, potassium and sodium salts are preferred, salts of other metals such as lithium, calcium, strontium, barium, magnesium, aluminum, boron, and the like, can also be used. The oxidants which are preferred are ammonium nitrate and potassium sodium, and ammonium perchlorates. In the preparation of the solid rocket propellant compositions, the oxidants are powdered to sizes preferably finer than about 200 mesh. The amount of solid oxidant employed is usually a major amount of the total composition and is generally in the range between 50 and 90 percent by weight of the total mixture. If, desired, however, less than 50 percent by weight of the oxidant can be used.

Commonly used combustion rate catalysts are metal ferrocyandies and ferricyanides. Ferric ferrocyanides such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide or Turnbull's blue is also applicable. Other metal compounds such as nickel and copper ferrocyanides can also be employed.

The amount of burning rate catalysts used in the propellant compositions of this invention will usually be in the range from 1 to 60 parts per 100 parts of rubbery polymer with from 5 to 50 parts being most frequently preferred.

The compositions are cured at temperatures generally in the range between 25 and 350° F. The curing temperature employed is determined, at least in part, by the solid oxidant used. For example, when a nitrate such as ammonium nitrate is used as the oxidant, curing is generally effected at lower temperature than when the oxidant is ammonium perchlorate. The epoxy curative agent of this invention are particularly effective at the lower temperatures. As an illustration, excellent curing rates are obtained at temperatures between 150 and 180° F. when ammonium nitrate is used as the oxidant and when an epoxy compound such as styrene oxide or epichlorohydrin is employed as the curative agent. Curing at these relatively low temperatures has certain advantages. The safety factor is important and obviously the hazards are less when operating at low temperatures. Another advantage is that there is no phase change in ammonium nitrate below these temperatures and, therefore, there is less tendency for cracking of the composition to occur during the curing process.

The time required to effect curing of the propellant compositions will depend upon the temperature employed. At the higher temperatures, the time might be as low as 15 minutes but more frequently it will range from 30 minutes or an hour to 10 days or even longer.

Example I

A series of solid rocket propellant compositions was prepared using, as the binder, a 90/10 butadiene/2-methyl-5-vinylpyridine rubbery copolymer, prepared by emulsion polymerization at 41° F. and having a Mooney value (ML–4) of 28. Prussian blue was used as the burning rate catalyst. Variable amounts of two epoxy compounds, styrene oxide and epichlorohydrin, were employed. One run was made for comparative purposes in which no epoxy compound was present. The following formulation was used for preparation of the compositions:

| | Parts by weight |
|---|---|
| 90/10 butadiene/2-methyl-5-vinylpyridine copolymer | 100 |
| Carbon black (Philblack A) | 20 |
| Benzotrichloride | 4.4 |
| Sulfur | 1.75 |
| Zinc oxide | 3.0 |
| Aerosol OT [1] | 1.0 |
| Butyl–8 [2] | 2.0 |
| TP–90B [3] | 20 |
| Prussian blue | 15 |
| Styrene oxide or epichlorohydrin | Variable |
| Ammonium chloride [4] | 50 |

[1] Dioctyl ester of sodium sulfosuccinic acid.
[2] Dithiocarbamate-type rubber accelerator.
[3] Dibutyl Carbitol formal.
[4] No oxidant was used in the composition but an amount of ammonium chloride was added which was necessary to give a pH comparable to that obtained when an oxidant is employed and at the same time produce a minimum of interference with the rubbery properties of the binder. Thus the test data provide a more accurate measurement of the curing quality of the composition than if larger quantities of the ammonium compound were present.

The compositions were cured 15 hours at 175° F. and tests made for tensile strength, elongation, and Shore hardness. The following results were obtained:

| Styrene oxide, phr.[1] | Epichlorohydrin, phr.[1] | Tensile, p.s.i. | Elongation, percent |
|---|---|---|---|
| ------ | ------ | 158 | 185 |
| 1.0 | ------ | 230 | 225 |
| 5.0 | ------ | 605 | 390 |
| ------ | 1.0 | 290 | 250 |
| ------ | 5.0 | 490 | 315 |

[1] Parts per 100 parts rubber.

The very low tensile strength in the composition containing no epoxy compound is evidence of greatly reduced cure.

*Example II*

A solid rocket composition was prepared using a 28 Mooney 90/10 butadiene/2-methyl-5-vinylpyridine copolymer, as described in Example I, as the binder, Prussian blue as the burning rate catalyst, and an Epon resin (designated as Epon Adhesive VI) as the epoxy compound. The formulation used for preparation of the composition was as follows:

Parts by weight
90/10 butadiene/2-methyl-5-vinylpyridine copolymer _____ 100
Carbon black (Philblack A)_____ 20
Benzotrichloride _____ 4.4
Sulfur _____ 1.75
Zinc oxide_____ 3.0
Prussian blue_____ 15
Aerosol OT [1]_____ 1.0
Butyl-8 [1] _____ 2.0
Epon Adhesive VI_____ 20
Ammonium chloride [1]_____ 50

[1] As in Example I.

The composition was divided into 3 portions and each portion cured at 175° F. for a different period of time. The data which follow show the effect of curing time on the tensile strength and elongation of the composition.

| Time of cure, hours | Tensile, p.s.i. | Elongation, percent | Shore hardness |
|---|---|---|---|
| 15 | 655 | 105 | 83 |
| 10 | 525 | 75 | 85 |
| 5 | 435 | 70 | 82 |

*Example III*

Solid propellant compositions were prepared using the butadiene/2-methyl-5-vinylpyridine copolymer described in Example I as the binder, Prussian blue as the burning rate catalyst, and Epon Adhesive VI as the epoxy compound. A control run was made using the commercial plasticizer, TP–90B (dibutyl Carbitol formal), and no epoxy compound. In the other compositions, variable amounts of Epon Adhesive VI were employed and the total quantity of material in each composition was maintained constant by adding TP–90B, when necessary, together with the Epon Adhesive VI. The formulation used is given below.

Parts by weight
Butadiene/2-methyl-5-vinylpyridine copolymer____ 100
Carbon black (Philblack A)_____ 20
Sulfur _____ 1.75
Zinc oxide_____ 3.0
Butyl-8 [1] _____ 2.0
Aerosol OT [1]_____ 1.0
TP–90B _____ Variable
Epon Adhesive VI_____ Variable
Prussian blue_____ 15
Ammonium chloride [1]_____ 50

[1] As in Example I.

The compositions were cured 15 hours at 175° F. and tests made for tensile strength and elongation. The following results were obtained:

| TP–90B, phr. | Epon adhesive VI, phr. | Tensile, p.s.i. | Elongation, percent |
|---|---|---|---|
| 20 | ------ | 85 | 180 |
| 15 | 5 | 195 | 70 |
| 10 | 10 | 570 | 130 |
| ------ | 20 | 590 | 70 |

*Example IV*

A 20 Mooney (ML–4) 90/10 butadiene/2-methyl-5-vinylpyridine copolymer was prepared by emulsion polymerization at 41° F. and employed as a binder in a series of solid rocket propellant compositions in which Prussian blue was used as the burning rate catalyst and epichlorohydrin as the epoxy compound. The following formulation was used:

Parts by weight
Butadiene/2-methyl-5-vinylpyridine copolymer_____ 100
Carbon black (Philblack A)_____ 20
Benzotrichloride _____ Variable
Epichlorohydrin _____ Variable
Sulfur _____ 1.75
Zinc oxide_____ 3.0
Prussian blue_____ 15
Aerosol OT [1]_____ 1.0
Butyl-8 [1] _____ 2.0
TP–90B [1] _____ Variable
Ammonium chloride [1] _____ 50

[1] As in Example I.

The compositions were cured 15 hours at 175° F. and tests made for tensile strength, elongation, and Shore hardness. The following results were obtained:

| Benzotrichloride, phr. | Epichlorohydrin, phr. | TP–90B, phr. | Tensile, p.s.i. | Elongation, percent | Shore hardness |
|---|---|---|---|---|---|
| 4.4 | 20 | 0 | 855 | 325 | 66 |
| 0 | 24.4 | 0 | 435 | 165 | 65 |
| 4.4 | 0 | 20 | 85 | 190 | 24 |
| 0 | 4.4 | 20 | 520 | 305 | 54 |
| 0 | 0 | 20 | 85 | 140 | 27 |

The very low tensile strength and Shore hardness in the two samples containing no epoxy compound are evidence of the retardation of cure.

*Example V*

Variable amounts of epichlorohydrin were employed in solid rocket propellant compositions prepared according to the following formulation:

Parts by weight
Butadiene/2-methyl-5-vinylpyridine copolymer [1]___ 100
Carbon black (Philblack A)_____ 20
Epichlorohydrin _____ Variable
Sulfur _____ 1.75
Zinc oxide_____ 3.0
Prussian blue_____ 15
Aerosol OT [2]_____ 1.0
Butyl-8 [2] _____ 2.0
TP–90B [2] _____ 20
Ammonium chloride [1]_____ 50

[1] As in Example IV.
[2] As in Example I.

The compositions were cured 15 hours at 175° F. The results were as follows:

| Epichlorohydrin, phr. | Tensile, p.s.i. | Elongation, percent |
|---|---|---|
| 2 | 125 | 160 |
| 4 | 395 | 255 |
| 8 | 420 | 270 |
| 12 | 310 | 190 |

Example VI

The following formulation was employed for the preparation of a series of solid rocket propellant compositions using ammonium chloride as a simulated solid oxidant:

| | Parts by weight |
|---|---|
| Butadiene/2-methyl-5-vinylpyridine copolymer [1] | 100 |
| Carbon black (Philblack A) | 20 |
| Benzotrichloride | Variable |
| Epichlorohydrin | Variable |
| Styrene oxide | Variable |
| Sulfur | 1.75 |
| Zinc oxide | 3.0 |
| Prussian blue | 15 |
| Aerosol OT [2] | 1.0 |
| Butyl-8 [2] | 2.0 |
| TP-90B [2] | Variable |
| Ammonium chloride [1] | 50 |

[1] As in Example IV.
[2] As in Example I.

The compositions were cured for variable periods of time at 175° F. and tested for tensile strength and elongation. The specific compositions, time of cure, and results of physical tests are shown in the following table:

| Benzo-trichlo-ride, phr. | Epoxide | | TP-90B phr. | Cure time, hours | Tensile, p.s.i. | Elonga-tion, percent |
|---|---|---|---|---|---|---|
| | Type | phr. | | | | |
| 4.4 | Epichloro-hydrin | 20 | 0 | 5 | 465 | 210 |
| 4.4 | ---do--- | 20 | 0 | 10 | 580 | 140 |
| 0 | ---do--- | 24.4 | 0 | 5 | 315 | 130 |
| 0 | ---do--- | 24.4 | 0 | 10 | 420 | 85 |
| 4.4 | ---do--- | 5 | 15 | 10 | 195 | 125 |
| 4.4 | ---do--- | 5 | 15 | 15 | 410 | 245 |
| 4.4 | Styrene oxide | 5 | 15 | 10 | 155 | 165 |
| 4.4 | ---do--- | 5 | 15 | 15 | 450 | 390 |

Example VII

Solid rocket compositions were prepared using a 90/10 butadiene/styrene rubbery copolymer, prepared by emulsion polymerization and having a Mooney value (ML-4) of 18, as the binder. Prussian blue was used as the burning rate catalyst and two epoxy compounds, epichlorohydrin and styrene oxide, were employed. One run was made for comparative purposes in which no epoxy compound was present. The following formulation was used for the preparation of the compositions:

| | Parts by weight |
|---|---|
| 90/10 butadiene/styrene copolymer | 100 |
| Carbon black (Philblack A) | 20 |
| Sulfur | 1.75 |
| Zinc oxide | 3 |
| Aerosol OT [1] | 1 |
| Butyl-8 [1] | 2 |
| Epichlorohydrin | 0 or 6 |
| Styrene oxide | 0 or 6 |
| Prussian blue | 15 |
| Ammonium chloride [1] | 50 |

[1] As in Example I.

The compositions were cured for periods of 15 hours and 55 hours at 175° F. and tests made for tensile strength and elongation. The following results were obtained:

| Epoxy compound | Tensile strength, p.s.i. | | Elongation, percent | |
|---|---|---|---|---|
| | 15 hrs. | 55 hrs. | 15 hrs. | 55 hrs. |
| Epichlorohydrin | 575 | 550 | 520 | 385 |
| Styrene oxide | 315 | 500 | 665 | 640 |
| None | 410 | 440 | 440 | 365 |

It is noted that retardation from Prussian blue is less severe in compositions containing butadiene/styrene rubber than in compositions containing butadiene/2-methyl-5-vinylpyridine rubber. However, there is an improvement in properties when epoxy compounds are present.

Example VIII

A solid rocket propellant having the following composition was prepared:

| | Parts by weight |
|---|---|
| Ammonium nitrate [1] | 82.5 |
| Binder | 17.5 |
| Combustion rate catalyst [2] | 2.0 |

[1] Ground in a Mikropulverizer at 14,000 r.p.m.; average particle size, 80 microns.
[2] Milori blue—a pigment similar to Prussian blue but having a red tint, prepared by the oxidation of a paste of potassium ferrocyanide and ferrous sulfate.

The binder had the following compositions:

| | Parts by weight |
|---|---|
| 90/10 butadiene/2-methyl-5-vinylpyridine copolymer, 20 ML-4 | 100 |
| Carbon black (Philblack A) | 10 |
| Benzophenone | 8 |
| Pentaryl A (amyl biphenyl) | 8 |
| Epichlorohydrin | 6 |
| Butyl-8 [1] | 2 |
| Sulfur | 1.75 |
| Zinc oxide | 3 |
| Aerosol OT [1] | 1 |
| Flexamine [2] | 3 |

[1] As in Example I.
[2] Physical mixture containing 65 percent of a complex diarylamineketone reaction product and 35 percent of N,N'-diphenyl-phenylenediamine.

The mechanical properties were determined and found to be as follows:

| Rate of loading,[1] in./min. | Test temp., °F. | Tensile | | | Compressive | | | Beam flexure [2] | | |
|---|---|---|---|---|---|---|---|---|---|---|
| | | Ultimate strength, p.s.i. | Ultimate elongation, percent | Young's modulus of elasticity, p.s.i. | Ultimate strength, p.s.i. | Ultimate deformation, percent | Young's modulus of elasticity, p.s.i. | Rupture force, lb. | Deflection at yield, in. | Modulus percent rupture,[3] p.s.i. |
| 3 | 170 | 270 | 10.4 | 3,200 | 750 | 17.7 | 8,390 | 13 | 0.23 | 125 |
| 3 | 70 | 330 | 8.8 | 4,380 | 1,100 | 11.7 | 10,120 | 33 | 0.22 | 330 |
| 3 | -75 | 590 | 19.6 | 5,890 | 1,100 | 11.1 | 10,810 | 164 | 0.38 | 1,710 |
| 10 | 170 | 190 | 6.6 | 5,470 | 660 | 13.2 | 11,270 | 14 | 0.29 | 140 |
| 10 | 70 | 445 | 12.1 | 5,360 | 1,100 | 10.2 | 12,600 | 44 | 0.17 | 455 |
| 10 | -75 | 750 | 7.7 | 9,900 | 1,100 | 7.2 | 16,770 | 190 | 0.35 | 1,960 |
| 20 | 170 | 235 | 6.6 | 5,860 | | | | 22 | 0.13 | 230 |
| 20 | 70 | 420 | 10.8 | 9,350 | 1,100 | 8.2 | 28,000 | 44 | 0.11 | 450 |
| 20 | -75 | 750 | 5.0 | 13,340 | | | | 215 | 0.35 | 2,220 |

[1] Cross-arm speed.
[2] Raw data obtained by center loading a bar 1" by 0.75" by 7", the bar being tested with the 1" side placed horizontally.
[3] A measure of strength.

Strands and grains were prepared from the above-described material, and ballistic data obtained. The average burning rate of twelve batches was 0.164 inch/second at 1000 p.s.i. from strand data (Crawford bomb) and 0.170 inch/second from motor data. Pressure exponent was 0.55 and characteristic exhaust velocity was 4008 ft./sec.

*Example IX*

A solid rocket propellant having the following composition was prepared:

| | Parts by weight |
|---|---|
| Ammonium nitrate [1] | 80 |
| Binder | 20 |
| Combustion rate catalyst [1] | 2 |

[1] As in Example VIII.

The binder had the following compositions:

| | Parts by weight |
|---|---|
| 90/10 butadiene/2-methyl-5-vinylpyridine copolymer, 20 ML-4 | 100 |
| Carbon black (Philblack A) | 15 |
| TP-90B [1] | 17 |
| Epichlorohydrin | 5.7 |
| Butyl-8 [1] | 1.9 |
| Sulfur | 1.7 |
| Zinc oxide | 2.9 |
| Aerosol OT [1] | 1.0 |
| Flexamine [2] | 2.9 |

[1] As in Example I.
[2] As in Example VIII.

As many possible embodiments may be made of this invention without departing from the scope thereof, it is to be understood that all mattter herein set forth or shown in the accompanying drawing is to be interpreted as illustrative and not in an unduly limiting sense.

I claim:

1. In a rocket propellant consisting essentially of a rubbery binder prepared by polymerizing butadiene and a copolymerizable monomer selected from the group consisting of styrene, alpha-methylstyrene, acrylonitrile, methacrylonitrile, methyl acrylate, methyl methacrylate, ethyl acrylate, butyl acrylate, 2-vinylpyridine; 2,5-divinylpyridine; 2-methyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5(α-methylvinyl)pyridine; 3,5-di(α-methylvinyl)pyridine; a solid inorganic oxidizing salt; a combustion rate catalyst selected from the group consisting of metal ferrocyanides and metal ferricyanides; and a vulcanizing agent; said solid inorganic oxidizing salt comprising a major amount of said propellant; the improvement comprising adding 0.5 to 40 parts by weight per 100 parts of said binder of an epoxy compound selected from the group consisting of ethylene oxide, propylene oxide, butylene oxide, 1,2-epoxypentane, 1,2-epoxy-3-methylbutane, styrene oxide, epichlorohydrin, epibromohydrin, butadiene monoxide, and epoxy resins having a molecular weight range of 250 to 10,000.

2. The propellant of claim 1 in which the amount of said epoxy compound is within the range of 1 to 25 parts by weight per 100 parts of said binder.

3. In a rocket propellant consisting essentially of a rubbery binder prepared by polymerizing butadiene and 2-methyl-5-vinylpyridine, a solid inorganic oxidizing salt, ferric ferrocyanide and sulfur, said solid inorganic oxidizing salt comprising a major amount of said propellant, the improvement comprising adding 1 to 25 parts by weight per 100 parts of said binder of epichlorohydrin to improve the curing rate of said propellant.

4. The propellant of claim 3 wherein said solid inorganic oxidizing salt is ammonium nitrate.

5. In a rocket propellant consisting essentially of a rubbery binder prepared by polymerizing butadiene and 2-methyl-5-vinylpyridine, a solid inorganic oxidizing salt, ferric ferrocyanide and sulfur, said solid inorganic oxidizing salt comprising a major amount of said propellant, the improvement comprising adding 1 to 25 parts by weight per 100 parts of said binder of styrene oxide to improve the curing rate of said propellant.

6. The propellant of claim 5 wherein said solid inorganic oxidizing salt is ammonium nitrate.

7. In a rocket propellant consisting essentially of a rubbery binder prepared by polymerizing butadiene and 2-methyl-5-vinylpyridine, a solid inorganic oxidizing salt, ferric ferrocyanide and sulfur, said solid inorganic oxidizing salt comprising a major amount of said propellant, the improvement comprising adding 1 to 25 parts by weight per 100 parts of said binder of an epoxy resin having a molecular weight of from 250 to 10,000 to improve the curing rate of said propellant.

8. In a rocket propellant consisting essentially of a rubbery binder prepared by polymerizing butadiene and 2-methyl-5-vinylpyridine, a solid inorganic oxidizing salt, ferric ferrocyanide and sulfur, said solid inorganic oxidizing salt comprising a major amount of said propellant, the improvement comprising adding 1 to 25 parts by weight per 100 parts of said binder of ethylene oxide to improve the curing rate of said propellant.

9. In a rocket propellant consisting essentially of a rubbery binder prepared by polymerizing butadiene and 2-methyl-5-vinylpyridine, a solid inorganic oxidizing salt, ferric ferrocyanide and sulfur, said solid inorganic oxidizing salt comprising a major amount of said propellant, the improvement comprising adding 1 to 25 parts by weight per 100 parts of said binder of butadiene monoxide to improve the curing rate of said propellant.

10. In the process of preparing a rocket propellant which comprises mixing with a rubbery binder prepared by polymerizing butadiene and a copolymerizable monomer selected from the group consisting of styrene, alpha-methylstyrene, acrylonitrile, methacrylonitrile, methyl acrylate, methyl methacrylate, ethyl acrylate, butyl acrylate, 2-vinylpyridine; 2,5-divinylpyridine; 2-methyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5(α-methylvinyl)pyridine; 3,5-di(α-methylvinyl)pyridine; a solid inorganic oxidizing salt; a combustion rate catalyst selected from the group consisting of metal ferrocyanides and metal ferricyanides; and a vulcanizing agent; said solid inorganic oxidizing salt comprising a major amount of said propellant; and wherein said propellant is vulcanized; the improvement which comprises adding from 0.5 to 40 parts by weight per 100 parts of said binder of an epoxy compound selected from the group consisting of ethylene oxide, propylene oxide, butylene oxide, 1,2-epoxypentane, 1,2-epoxy-3-methylbutane, styrene oxide, epichlorohydrin, epibromohydrin, butadiene monoxide, and epoxy resins having a molecular weight range of 250 to 10,000 prior to vulcanization, said epoxy compound improving the rate of vulcanization of said propellant.

11. The method of claim 10 wherein said epoxy compound is styrene oxide.

12. The method of claim 10 wherein said epoxy compound is epichlorohydrin.

13. The method of claim 10 wherein said epoxy compound is an epoxy resin having a molecular weight of from 250 to 10,000.

14. The method of claim 10 wherein said epoxy compound is ethylene oxide.

15. The method of claim 10 wherein said epoxy compound is butadiene monoxide.

(References on following page)

References Cited in the file of this patent

UNITED STATES PATENTS

| | | |
|---|---|---|
| 1,021,882 | O'Brien | Apr. 2, 1912 |
| 2,170,191 | Fisher | Aug. 22, 1939 |
| 2,402,020 | Cislak et al. | June 11, 1946 |
| 2,433,943 | Zwicky | Jan. 6, 1948 |
| 2,539,824 | Garber et al. | Jan. 30, 1951 |
| 2,581,464 | Zech | Jan. 8, 1952 |
| 2,607,754 | Ellingboe et al. | Aug. 19, 1952 |
| 2,643,239 | Shokal et al. | June 23, 1953 |

FOREIGN PATENTS

| | | |
|---|---|---|
| 655,585 | Great Britain | July 25, 1951 |

OTHER REFERENCES

Marchionna: Butalastic Polymers—a Treatise on Synthetic Rubbers, Reinhold Publishing Corp., New York (1946), page 361.

Whitmore: Organic Chemistry, D. Van Nostrand Co. Inc., New York, fourth printing (1941), page 566.